United States Patent [19]

Edling et al.

[11] Patent Number: 4,554,759

[45] Date of Patent: Nov. 26, 1985

[54] METHOD AND MEANS FOR HARVESTING CRAYFISH

[75] Inventors: Robert J. Edling, Baton Rouge; Karl L. Morgan, Fort Allen, both of La.

[73] Assignee: Research Corporation, New York, N.Y.

[21] Appl. No.: 484,154

[22] Filed: Apr. 12, 1983

[51] Int. Cl.⁴ .............................................. A01K 69/06
[52] U.S. Cl. ........................................ 43/100; 43/102; 119/2
[58] Field of Search .................... 43/100, 102, 6.5, 4, 43/4.5; 119/2, 3, 4

[56] References Cited

U.S. PATENT DOCUMENTS

| | | | |
|---|---|---|---|
| 3,184,881 | 5/1965 | Jatzeck | 43/102 |
| 3,191,338 | 6/1965 | Burgess | 43/102 |
| 3,465,901 | 9/1969 | Grabowski | 43/102 |
| 3,831,311 | 8/1974 | Cushing | 43/6.5 |
| 3,852,908 | 12/1974 | Christopher | 43/102 |
| 3,909,971 | 10/1975 | Wilde | 43/6.5 |
| 4,028,821 | 6/1977 | Hanks | 43/102 |
| 4,184,283 | 1/1980 | Wyman | 43/102 |
| 4,276,710 | 7/1981 | Yunker | 43/4 |

Primary Examiner—Gene P. Crosby
Attorney, Agent, or Firm—Scully, Scott, Murphy & Presser

[57] ABSTRACT

A method and apparatus for harvesting crayfish in a shallow aquatic bed as disclosed. A plurality of one way traps are aligned in a linear array and supported by a frame that extends above the water level. The traps are lowered into the water for a set time of 5 to 120 minutes, and then raised to discharge the collected crayfish into a collection hopper. While the traps are out of the water, the linear array is advanced 3 to 12 meters along an axis substantially perpendicular to the axis of the array. The crayfish are conveyed from the collection hoppers to a single storage tanks by a water sluice conveyor. The trap set and the discharge cycle is repeated until the harvester has traversed the aquatic bed.

23 Claims, 6 Drawing Figures

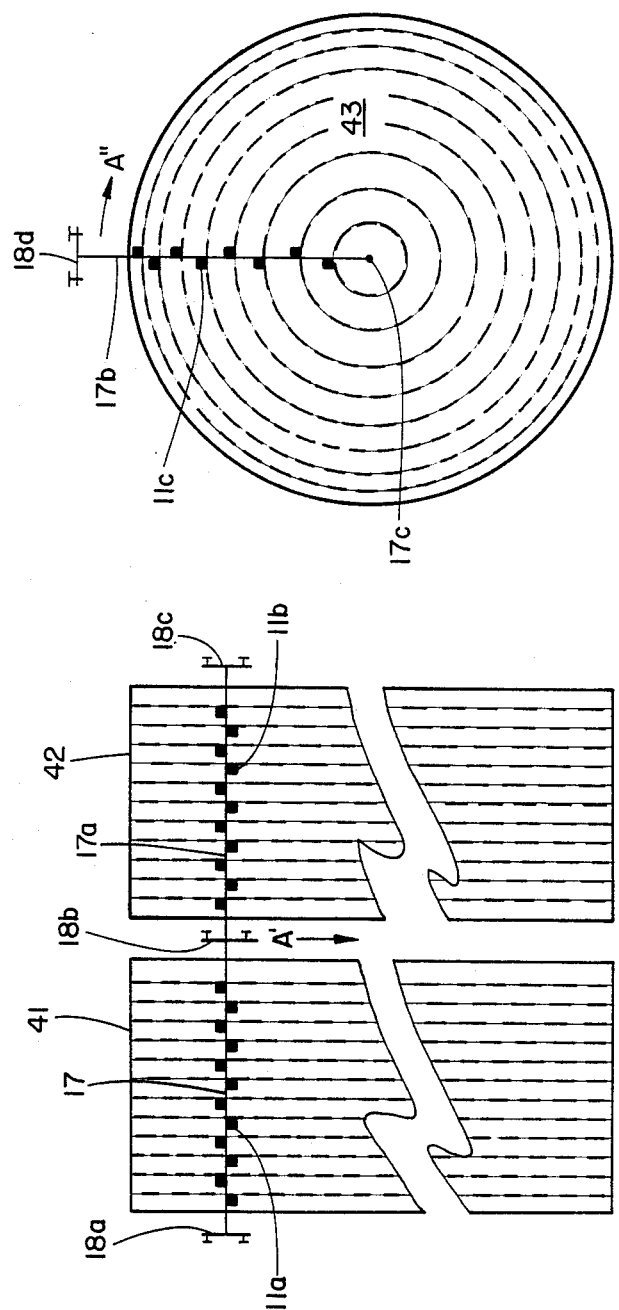

METHOD AND MEANS FOR HARVESTING CRAYFISH

FIELD OF THE INVENTION

The present invention is particularly suited to the commercial aquaculture of crayfish. The large demand for crayfish, combined with an unstable supply from natural waters, has led to the commercial culture of crayfish in Louisiana. Land used in crayfish aquaculture is estimated to be 90,000 acres, with approximately ⅓ of this land in rotation with rice.

The crayfish are grown in ponds that are various sizes and shapes, and flooded to a water depth of 1 to 3 feet. The ponds are usually stocked in May, if it is a new pond, but subsequent stocking is not necessary after the first year of use. The crayfish ponds are drained in early June and lie idle during the summer, allowing vegetation, which serves as food to the crayfish to grow in the pond. Ponds are flooded from mid-September to mid-October, and harvesting begins in mid-November. The crayfish are harvested from November through May, and in June the ponds are again drained and the cycle repeats.

If crayfish are double cropped with rice, the ponds are lowered in April, and the rice is planted. The rice is then grown and harvested as with normal rice harvesting practices, except that the stubble is either left in the field, or baled to be later fed to the crayfish. The ponds are then reflooded in the fall for the crayfish.

There are over 300 species of crayfish worldwide, and over 100 species in the United States. Louisiana is by far the largest producer of crayfish, producing over 90 percent of the crayfish grown in the United States. Only two species in Louisiana appear in sufficient numbers to be of economic importance. Both species, *Procambarus clarkii*, called the red swamp crayfish, and *Procambarus acutus acutus*, known as the white river crayfish, are similar biologically and occur together naturally. The red swamp crayfish is naturally distributed in 14 states in Southeastern, Central and Southwestern United States, and in four states in Mexico. It has been introduced in the states of California, Hawaii, and Virginia and to Spain, Japan and Africa. The white river crayfish is found in 30 states from Maine to the Florida Panhandle, and west to Texas and north to Minnesota. *Pacifastacus leniusculus*, the signal crayfish, is cultured on the west coast. Its native habitat ranges from California to British Columbia.

DESCRIPTION OF THE PRIOR ART

The earliest known method of catching crayfish was to tie a piece of meat on a string, slowly pull the string in, and net the crayfish when it came to the surface of the water.

The next method developed was the liftnet. A liftnet is approximately 18 inches square, and fixed at the corners to a heavy wire that hinges approximately 24 inches above the center of the net. A piece of meat is tied to center of the net for bait, and the nets are set about 10 feet apart in a line in shallow water. The nets are lifted every few minutes with a short pole, emptied and rebaited and relocated as needed. Since the nets must be visible above the water, they can be used only in water less than 18 inches deep.

When fishing for crayfish in deeper water, a pillow trap is used. A pillow trap is a cylindrical wire trap with a cone shaped funnel leading into the trap on one end, with the other end held shut. It is baited with fish and left overnight in the water. Pillow traps are also frequently constructed with two funnels in the bottom and an open top. A metal rod is inserted in the trap to make it stand upright with the top above water.

The foregoing prior art traps are normally baited with approximately ½ pound of fish such as gizzard shad or carp. The traps are normally placed in ponds in Louisiana at densities of 10 to 40 traps per acre. The majority of farmers in Louisiana use 10 traps per acre and empty and rebait them once every 24 hours.

Various methods of mechanized harvesting have been tried. The fastest method used to run crayfish traps requires two people and a motor-driven boat. While the boat is moving, the person in the front of the boat removes the traps from the pond, empties the traps and replaces them. The person in the back of the boat perates the outboard motor and throws bait into the traps. Fishermen using this method are capable of running approximately 250 traps per hour. Optionally, other drive means may be used for the boat to propel the boat through the water, thereby doing away with the outboard motor and allowing the boat to be operated by a single person who is able to run the traps alone.

Still another method of mechanically harvesting crayfish involves a modified levee sprayer which is used to drive through the ponds allowing the operator to run the traps. It is an all-wheel drive buggy that straddles the traps as it drives through the pond. The operator handles the traps from the front of the buggy.

An experimental method is also being tested as a push-trawl device that incorporates an electrical fishing unit. An electric field is set up in front of the pushtrawl that causes the crayfish to jump away from the pond bottom so that the trawl can capture them more easily. The trawl is pushed in front of a small boat, and periodically lifted and emptied into the boat. The crayfish are then separated from the trash and sorted to return undersized crayfish to the pond.

U.S. Pat. No. 4,276,710 discloses an aquaculture pond and harvester that includes an elongated truss which is supported on either end by a carriage, and suspends a plurality of flexible tines that engage the aquatic bed. The device then rakes the shrimp, prawn or other aquaculture from the pond as it traverses the manmade pond with the tines. As illustrated in FIG. 8, the aquaculture is raked into a trough 82 for collection at 86. body of water.

U.S. Reissue Pat. No. 30,038 discloses an aquaculture system for the raising of aquatic, non-air breathing, carnivorous animals which utilizes a generally enclosed U.S. Pat. No. 3,831,311 and U.S. Pat. No. 3,909,971 both disclose apparatus for use in handling a plurality of traps that are intermittently placed in water for the collection or breeding of commercial aquatic creatures.

U.S. Pat. No. 4,272,904 discloses a device for handling and tilting a crabpot that is intended to be attached to the side of a boat to assist in the manipulation of the crabpot.

U.S. Pat. Nos. 3,191,336; 4,134,226 and 4,184,283 disclose wire mesh traps that are used to attract and collect crabs for commercial fishermen.

SUMMARY OF THE INVENTION

The present invention includes both a method and means for harvesting crayfish and other edible decapod crustacean from an aquatic bed. The harvester includes a plurality of traps that are arrayed in a linear array under an elevated support means that is used to raise and lower the traps from a first position in engagement with the aquatic bed to second position for discharging the collected crayfish. The harvester is equipped with a plurality of collection means for receiving the collected crustacea from each of the traps as the traps are lifted and discharged. A water sluice conveyer is further provided to convey the collected crayfish from the collection hoppers to a single storage means.

The method of harvesting crayfish includes a pattern of setting, discharging, and resetting the traps as described above wherein the traps are set in predetermined pattern on the aquatic bed. The set period for the trap ranges from 5 to 120 minutes, and the discharge period ranges from 1 to 4 minutes. The harvester is moved 3 to 12 meters while the traps are being discharged so that when the traps are lowered into the water, they are repositioned at a new set point. Alternately, the traps may be raised and lowered twice during each set period, and intermittently moved after alternating set periods. The traps are generally moved in a direction perpendicular to the linear array of traps, and the setting, discharging, and resetting of the traps is continued until the harvester has traversed the entire aquatic bed.

The aquatic harvester further includes a means for providing both reciprocal and pivotable movement for each of the traps. The traps are reciprocated into and out of engagement with the aquatic bed to a pivot point. Upon reaching the pivot point, they are pivoted upwardly to an inclined inverted position to discharge the collected crayfish into the collection hopper. After the crayfish have been discharged, the traps are then pivoted back to a vertical position and reciprocated into engagement with aquatic bed. The reciprocating motion is used to compensate for variations in water depth or aquatic bed level that may be encountered as the harvester traverses the crayfish pond.

The harvester utilizes a large support frame, such as those provided for mechanical irrigation of farm land to support the traps and the means for raising and lowering the traps. This support frame may also be equipped with a plurality of individually driven wheels which enable the frame to traverse the pond during the discharge cycle. While in the preferred embodiment, electrical motors are used to drive the wheels and raise and lower the traps, it should be understood that gasoline motors or hydraulic motors could also be used if desired.

In the preferred embodiment of the invention, manmade ponds approximately 30 meters in width are formed with a water depth of 1 to 3 feet. A plurality of ponds can be arrayed side-by-side with a single harvester that is used to traverse the ponds or a plurality of modular harvesters that are ganged together to traverse a plurality of ponds simultaneously.

It is therefore an object of the present invention to provide a means and method for commercially harvesting crayfish that will harvest large areas with a minimal amount of manual labor. It is further an object of the present invention to provide a method and means for harvesting crayfish that will not interfere with the growth and reproductive cycle of the crayfish, and will permit the release of undersized crayfish.

It is another object of the present invention to provide a mechanical crayfish harvester to harvest large ponds of 25 acres or more with a minimal labor cost.

It is further an object of the further invention to achieve a trap density as high as 200 traps per acre, if desired, with a significantly lower input of manual labor.

BRIEF DESCRIPTION OF THE DRAWINGS

FIG. 2 is a diagrammatic example of 2 aquatic beds being traversed with a single modular aquatic harvester.

FIG. 3 illustrates an alternate array configuration for an aquatic harvester constructed in accordance with the present invention.

DETAILED DESCRIPTION OF THE PREFERRED EMBODIMENTS

Figure 1:
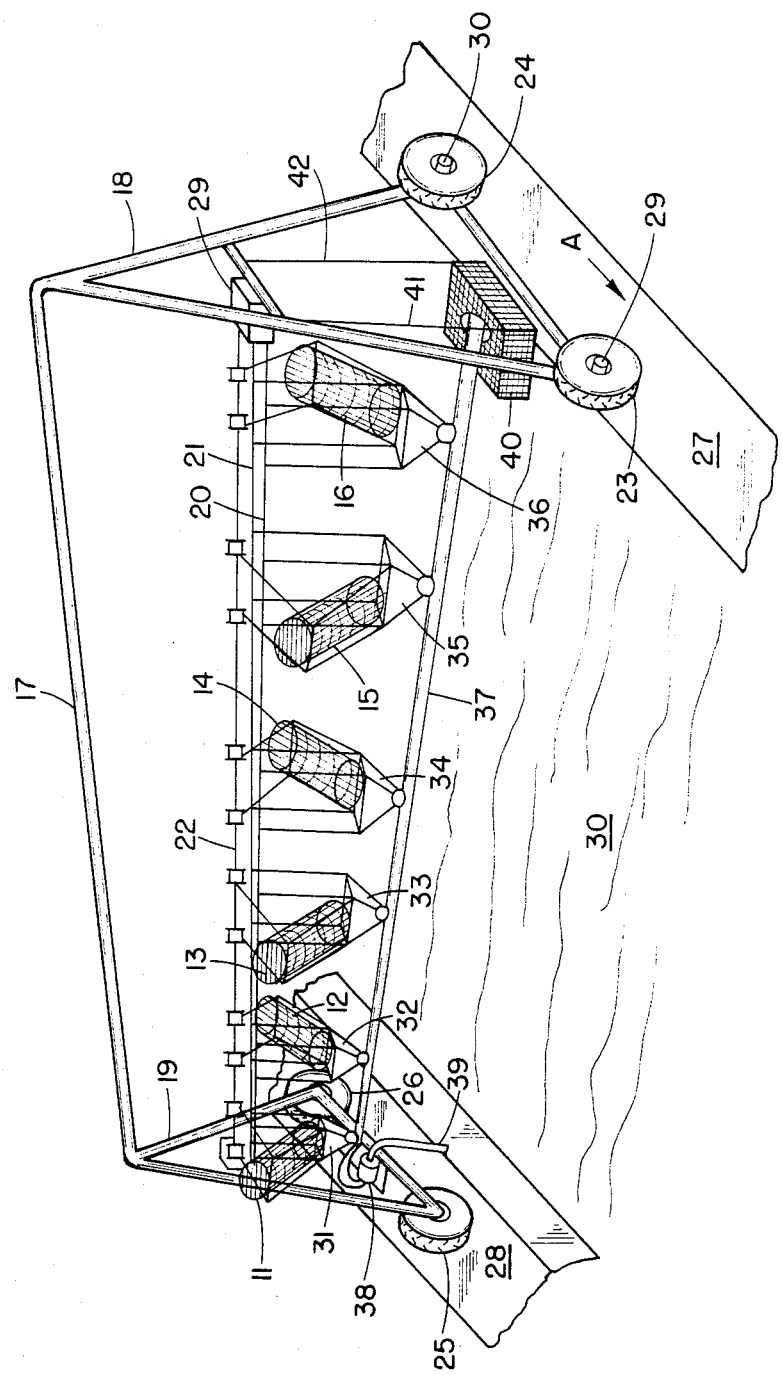
FIG. 1 is an isometric view of one embodiment of the invention illustrating a plurality of one way traps arranged in a linear array over an aquatic bed.

An aquatic harvester constructed in accordance with the teachings of the present invention as illustrated in FIG. 1. In the example illustrated in FIG. 1, only 6 one way traps 11-16 have been illustrated. In normal practice, the harvester frame will be constructed from the chassis of an agricultural irrigator that is normally available in 100 to 200 foot long spans. Inasmuch as the preferred spacing of the traps is 2 to 4 meters apart, it is apparent that anywhere from 6 to 15 traps could be placed on an irrigator frame, with a preferred number of 10 traps spaced every 3 meters or approximately 10 feet apart. As illustrated in FIG. 1, the irrigator frame 17 has a ground clearance of 12 feet and is supported at each end by triangular support towers 18 and 19, each of which is modular in nature to provide for end to end construction as illustrated in FIG. 2. When similar towers are constructed as agricultural irrigators, as many as twenty spans, with 10 spans on each side of the control cart, are connected in series.

The individual traps 11-16 are suspended from individual sub-frames as will be herein after more fully described with respect to FIG. 6. Each of these subframes is suspended from a pair of cross-beams 20 and 21 which span the irrigator between towers 18 and 19. These intermediate beams also support a rotating shaft means 22 which is schematically illustrated in FIG. 1, and more fully illustrated in FIG. 6. Each of the irrigator towers 18, 19 is equipped with wheels 23-26 for movement of the support means along the earthen dikes 27 and 28. Each of the wheels 23-26 is equipped with an electric motor illustrated as 29 and 30 for wheels 23 and 24. The irrigator is also equipped with an electric generator (not shown) to supply power for the various motors, timers, pumps and other accessory devices used in the harvester.

An electric motor 29 rotates shaft 22 to lift the one way traps 11-16 from the bottom of the aquatic pond 30 and discharge the collected crayfish into the hopper means 31-36. The electric motor 29 is de-energized when the traps are raised to an inverted inclined position as illustrated in FIG. 1. The crayfish then crawl or fall through the open tops of the traps 11-16 into the collection hoppers 31–36. During this discharge cycle, the irrigator is moved along the dikes 27 and 28 by the electric motor means 29 and 30 in the direction indicated by arrow "A". As the crayfish fall into the hopper means 31–36, they are funneled into a water sluice conveyer 37 located beneath each of the collection means 31–36. The water sluice conveyer 37 has water from the aquatic pond pumped through it by means of pump 38 and water intake manifold 39. The crayfish are transported by means of the water sluice conveyer 37 to a temporary storage means 40 located at one end of the support means of 17. As illustrated in FIG. 1, the support means 40 comprises an open mesh basket supported from the tower 18 by means of channel irons 41 and 42. Inasmuch as a substantial portion of the storage means 40 is submerged in the water contained in the aquatic bed 30, the crayfish are maintained in an aquatic environment, with the water aerated by action of the pump means 38, and the water sluice conveyer 37.

The discharge period for the crayfish harvester illustrated in FIG. 1 is 1 to 4 minutes. During this time, the aquatic harvester has moved in the direction of arrow "A" a distance of 3 to 12 meters whereupon the harvester stops, and the one way trap means 11–16 are lowered back to the aquatic bed 30 at their new location.

As illustrated in FIG. 2, the preferred embodiment of the invention is utilized in a series of manmade aquatic basins, 2 of which are illustrated as 41 and 42 in FIG. 2. As indicated previously, the modular nature of the frames 17–19 permit the interconnection of as many as 10 spans such as illustrated at 17 and 17a mounted on either side of a central control tower. Each of the lagoons or basins 41 and 42 would be 100–200 feet wide, and would be as long as conveniently possible, given tne slope of the land in which they are located. If the aquatic bed was slightly more than 400 feet long and 100 feet wide, each of the aquatic beds 41 and 42 as illustrated in FIG. 2 would encompass one acre of harvesting area. In a test pond constructed to evaluate the present invention, each of the ponds were approximately one acre in size. It should be noted, however, that any size pond would be useable and the length of the pond is limited only by the land available for constructing it. In the preferred embodiment, each of the aquatic ponds 41 and 42 have a mean water level of 1 to 3 feet during the crayfish season. The ponds are alternately drained and reflooded at the beginning and end of each season, and during the planting and harvesting of an intermediate rice crop. The rice crop provides a double crop yield for the farmer, and provides vegetation or stubble for the crayfish to feed on during the winter months when they are being harvested.

As illustrated in FIG. 2, each of the spans 17 and 17a are supported by towers 18a–18c and support therebetween 10 one way trap means schematically illustrated in FIG. 2. Each of the one way trap means, schematically illustrated as 11a for pond 41 and 11b for pond 42 will traverse the dotted lines illustrated in FIG. 2 as the support means 17a and 17b traverses the ponds 41 and 42 as indicated by the arrow "A'''. As illustrated in FIG. 2, if the aquatic ponds 41 and 42 are approximately 2 acres in size, and 800 feet long, the harvester will set and empty 800 traps in approximately 13 hours, assuming a 20 minute set time for each trap, and a 20 foot lineal movement in the direction of arrow "A'" during each discharge.

It should be noted that while 2 aquatic ponds 41 and 42 have been arrayed side-by-side as illustrated in FIG. 1, it is also highly conceivable that a plurality of aquatic ponds would be arrayed end-to-end to take full advantage of the capital investment involved in constructing the crayfish harvester illustrated in FIG. 1.

An alternate configuration for a harvester is illustrated in FIG. 3 wherein a single support beam 17b is arrayed with one portion thereof 17c stationary and the opposite end thereof moving in a circular path as indicated by arrow a "A''''". Alternately, the span could completely traverse the cylindrical pond 43 with the center portion 17c stationary, and either end moving around the circle. It should be noted also that in the embodiment illustrated in FIG. 3, the traps schematically illustrated as 11c are placed closer together as their distance from the radial center 17c increases. This means that the trap density remains substantially constant, even though the outer traps will move a substantially greater distance than the inner traps when the tower 18b is advanced.

It should be noted in the embodiment illustrated in FIG. 1–3 the one way trap means 11–16 are staggered to be lifted from their discharge position on alternate sides of the center span 17. This is done to minimize the strain on the center span 17, the intermediate frame members 20 and 21, and the support towers 18 and 19. It should also be noted that although a linear array is depicted in FIGS. 1–3, a staggered array, or an array having a plurality of central beams 17, and transverse alignments of traps 11–16 can be used in the practice of the invention.

Figure 4:
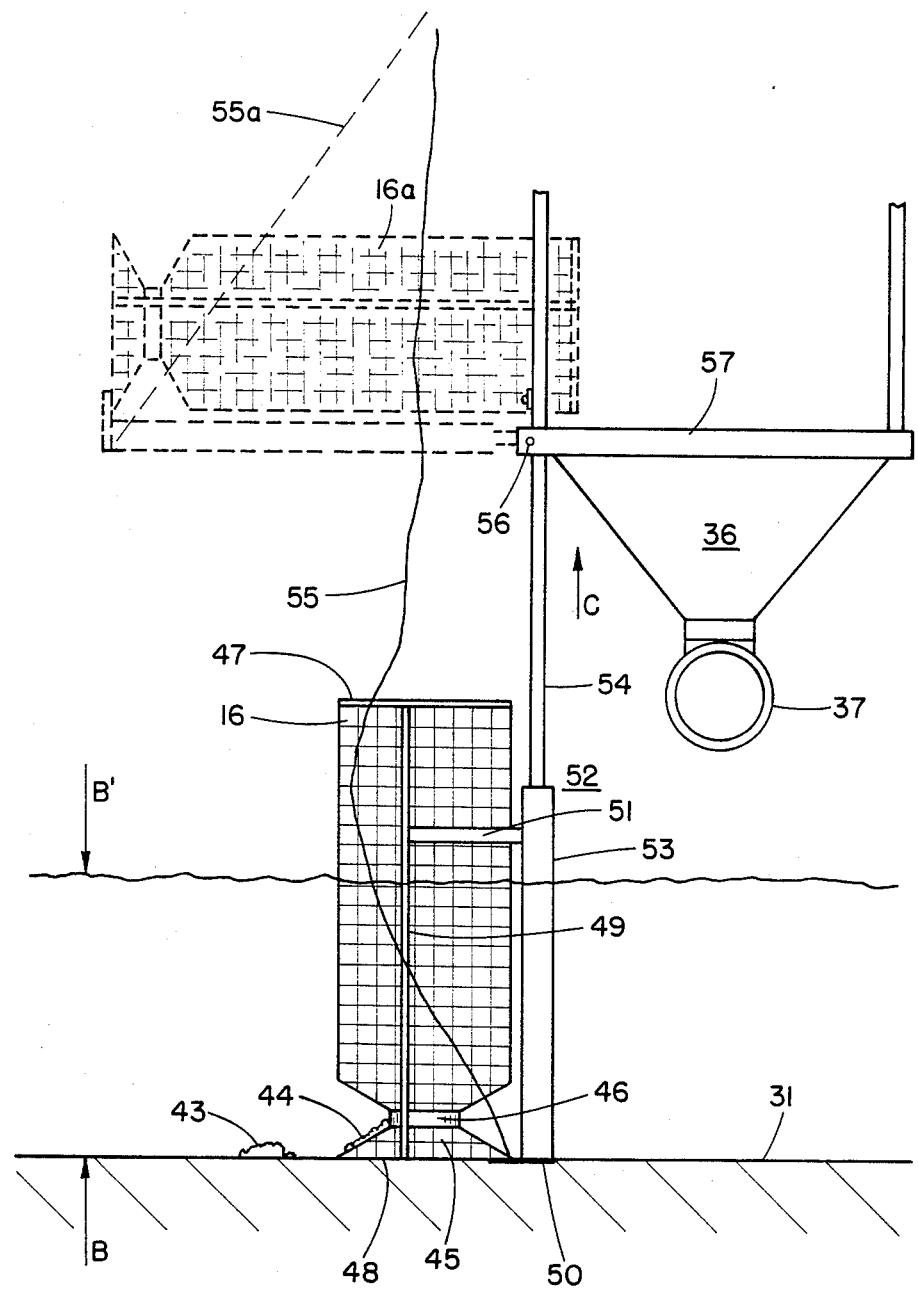
FIG. 4 is an enlarged cross-sectional view illustrating the trap means in first and second positions, the collection means and a conveyer means.

An enlarged side view of a portion of the crayfish harvester is illustrated in FIG. 4. As illustrated, the one way trap means 16 is resting on the aquatic bed 31 at approximately 1 to 3 feet of water as indicated by the arrows B—B' during the crayfish harvesting season. The crayfish, indicated at 43 and 44 are attracted by means of bait placed in a baitwell (illustrated in FIG. 5) and climb a gently sloping sidewall 45 to enter one of a series of crayfish entrance slots 46 formed in the sidewall of the one way trap means 16. After entering the entrance slots 46, they are trapped in the lower most portion of the trap, and it has been found that if their antennae cannot touch the uppermost portion of the sloping sidewall at the entrance slots, they are less likely to climb out of the trap. The slots 46, are placed 3 to 6 inches above the floor of the trap 16. The trap 16 is supported by a first support means 47 and a second support means 48 formed on either end of the trap with a longitudinal brace 49 extending therebetween. The trap is secured to the crayfish harvester by means of angle irons 50 which anchor the lower most portion of the trap 16, and by horizontal braces 51 which secure the vertical supports 49 to a reciprocating means 52. The reciprocating means 52 is formed of a long hollow cylinder 53 and an inner rod 54 which is mounted for reciprocation within cylinder 53. The trap means 16 is raised from the aquatic bed 31 by means of a flexible cable 55 which is shown in a relaxed state in solid lines, and in a taut state in dotted lines 55a in FIG. 4. When the motor means 29 is energized, the flexible cable 55 is wrapped around a reel, as will hereinafter be explained with respect to FIG. 6, and the one way trap means 16 is lifted vertically from the aquatic bed 31 until it engages the pivot point 56 formed on the intermediate support means 57. At the end of the reciprocal travel, indicated by the arrow "C" in FIG. 4, the trap means begins to tilt to the position illustrated by the dotted line 16a in FIG. 4. After the one way trap means 16a has been elevated to its inverted inclined position, as illustrated in FIGS. 1 and 4, the crayfish crawl or are dumped into the hopper 36, and directed by hopper 36 into the water sluice conveyer 37 to be transported to the storage means 40 illustrated in FIG. 1.

The combined reciprocal and pivotal motion illustrated in FIG. 4 is used to enable the harvester to deposit each of the various trap means 11-16 in a vertical upright position regardless of the uneven nature of the aquatic bed 31. Thus, if the desired operating mean water table B—B' is 1 to 3 feet, it is apparent that the reciprocal motion between rod 54 and tube 53 should encompass at least 2 feet of vertical travel, before beginning its pivot around the pivot point 56.

Figure 6:
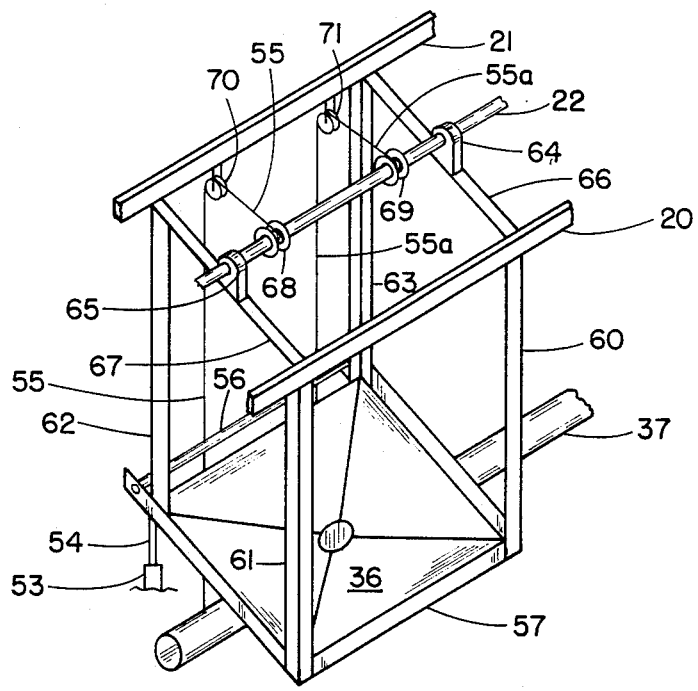
FIG. 6 is an isometric view of the means used to raise and lower the trap means from their set position on the aquatic bed to their discharge position over the collection hopper.

As illustrated in FIG. 6, an intermediate support frame 60-63 supports each of the individual one way trap means 11-16. Frames 60-63 may be angle irons that are welded or bolted to intermediate frame member 20 and 21 and which descend downwardly to form a rectangular frame 57 around the upper portion of the hopper 36. The rotatable shaft 22 is journaled for rotation in bearings 64, 65 which in turn are supported by additional angle irons 66, and 67 which span the intermediate frame members 20 and 21. In the preferred embodiment, each of the intermediate support means includes a pair of reels or drums 68, 69 which rotate as shaft 22 is rotated. Each of the flexible cables 55, 55a is suspended from pulley means 70 and 71 to insure that the reciprocating frame means will begin to pivot about rod 56 when the cylinder 53 has reached the end of its reciprocal travel along rod 54. Motor means 29 may be energized and de-energized by means of a timer, or by means of cams carried by one or more of the flexible cables 55 which trigger position switches (not shown) as the one way trap means 16 is lifted and pivoted into its discharge position.

Figure 5:
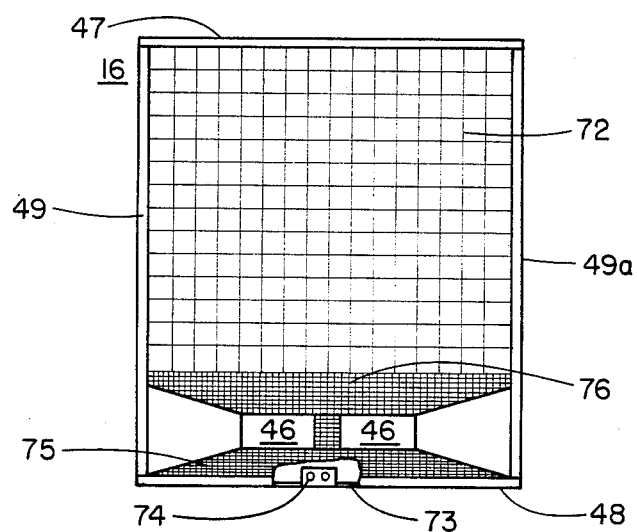
FIG. 5 is an elevation view of a trap means constructed in accordance with the present invention.

The one way trap means is more fully illustrated with respect to FIG. 5 wherein the first support means 47 and the second support means 48 take the form of circles or rectangles with a pair of longitudinal braces 49 and 49a arranged therebetween. An upper mesh wall 72 is formed of ¾ inch coated chicken wire and is approximately 36 inches tall. The size of the mesh is standard size used in the construction of crayfish traps and the mesh size sorts the crayfish, allowing the small ones to fall back into the water through the mesh, while retaining the marketable size crayfish. The one-way trap means may be constructed as a cylinder, or as a polygon, as desired. When constructed as a square polygon, the frame members 47 and 48 are approximately 24 inches square, and when constructed as a cylinder, the cylinder has a diameter of approximately 24 inches.

The trap means further includes a mesh bottom 73 formed of ¾ inch chicken wire. The bottom mesh wall also supports a baitholder 74 for confining and securing fishheads or other bait as may be desired. Baitholder 74 maintains the bait at the bottom of the trap, even though the trap is repeatedly lifted and inverted to an inclined inverted position as illustrated in FIG. 1 and 4.

The one way trap means also includes a second mesh wall 75 around the lower most portion of the trap which defines a gently sloping sidewall that terminates in a plurality of crayfish entrance slots 46 arranged around the inner perimeter of the trap means 16. A third mesh wall 76 defines a reverse sloping sidewall extending upwardly and outwardly from the crayfish entrance slots 46 to the upper mesh walls 72. If the frames 47 and 48 have been formed as circles, the second and third mesh walls 75 and 76 define truncated conical forms having their truncated planes facing one another. If the frames 47 and 48 have been formed as rectangles, the second and third mesh walls define truncated pyramids having their truncated planes facing one another. It was found in designing and testing traps, that if the crayfish did not touch the upper perimeter of sloping sidewall 75 with their antennae they would be less likely to climb out of the tank, and would roam around on the bottom mesh 73, or try to retrieve the bait from the baitholder 74. Thus, it is desired to make the lower most portion of the crayfish entrance slots 3 to 6 inches above the mesh bottom member 73.

While one embodiment of the crayfish harvester has been described and illustrated in FIGS. 1-6, it is apparent that many alternate configurations of traps and support means could be utilized in the practice of the present invention. The crayfish harvester has illustrated in FIG. 1-6 as a simple mechanized system that will function in adverse weather conditions, wherein many of the operating parts are submerged in 1 to 3 feet of water. The aquatic bed 31, normally contains fallen, standing and/or floating vegetation, and while constructed in flat terrain is subject to variations in height and water level. Crayfish tend to stay on the bottom of the aquatic bed 31, but are highly mobile in water or on solid surfaces. They are easily frightened while in the water, and can swim at speeds of approximately 4 feet per second. As the water temperature begins to warm to 50° F., the crayfish become active, and their activity increases as the water temperature increases. They tend to be more active at night or in subdued light, and will feed on dead or living plant material and animal material. They are voracious feeders, and under good conditions, can grow to marketable size in 90 days. At any given time, there are all ages and sizes of crayfish in the pond. For a few hours after molting, crayfish are inactive and very fragile. They will not enter a trap while in their molting condition.

While the invention has been described with respect to attracting and collecting crayfish, it is apparent that any bottom dwelling edible decapod crustacean could be harvested given the appropriate environment for the aquatic bed 31. Crabs and lobsters are also attracted to bait and may be captured in one-way traps in deeper waters. If cultivated as part of an aquaculture, they could be collected and harvested as hereinbefore described with respect to the invention illustrated in FIGS. 1-6.

What is claimed is:

1. An aquatic harvester for attracting and collecting edible decapod crustacean from an aquatic bed, said harvester comprising:
   (a) a plurality of one way trap means for attracting and collecting edible decapod crustacean
   (b) a support means for raising and lowering said plurality of trap means from a first position in engagement with an aquatic bed to a second position for discharging the collected crustacea;
   (c) a collection means for receiving the collected crustacea from each of said one way traps when said traps are discharged;
   (d) a means for conveying said collected crustaceans to a single storage means;
   (e) a means for intermittently moving said support means along the aquatic bed to enable the traps to be reset on the aquatic bed by said support means during intermittent stationary periods.

2. An aquatic harvester as claimed in claim 1 wherein said one way traps are arrayed in a linear array, said harvester advancing along an axis substantially perpendicular to said linear array during each period of movement.

3. An aquatic harvester as claimed in claim 1 wherein said support means define an elongated linear beam arranged above said traps, said traps being raised and lowered by a motor means.

4. An aquatic harvester as claimed in claim 1 wherein said harvester further includes a motor means for rotating a shaft, said shaft having mounted thereon a reel for each of said traps, said traps being connected to said reels by a flexible cable.

5. An aquatic harvester as claimed in claim 4 wherein said traps are pivotably mounted on said support means, said traps being pivoted from a vertical first position to a second inclined and inverted position by said flexible cable, as said cables are wrapped around said reels by said motor means.

6. An aquatic harvester as claimed in claim 5 wherein said traps are mounted for both pivotable and reciprocating motion, said traps being discharged when pivoted to an inclined and inverted position, and positioned on an aquatic bed of varying depth during said reciprocating motion.

7. An aquatic harvester as claimed in claim 3 wherein said means for intermittently moving said harvester comprises a plurality of wheels arrayed at either end of said linear beam, said wheels being driven during the moving period and stationary during said intermittent stationary period.

8. An aquatic harvester as claimed in claim 1 wherein said means for conveying said collected crustaceans is a water sluice conveyor arranged below each of said collection means.

9. An aquatic harvester as claimed in claim 8 wherein each of said collection means comprises a hopper for receiving said collected crustaceans as they are discharged from said one-way trap means.

10. An aquatic harvester as claimed in claim 2 wherein said traps are spaced 2 to 4 meters apart in a linear array.

11. An aquatic harvester as claimed in claim 2 wherein said harvester comprises a plurality of modular arrays with each of said modules having a linear span of 30 to 60 meters.

12. An aquatic harvester as claimed in claim 2 wherein said harvester is arranged with a first portion of said linear array stationary, and a second end portion transcribing a circle around said first portion as said harvester is moved.

13. A one-way trap means for attracting and collecting edible crayfish, said trap comprising:
(a) a first and second frame members, said first frame member supporting the trap when deposited in a vertical position on an aquatic bed, said second frame member providing an opening for discharging said trap when tilted to an inclined and inverted position;
(b) an upper mesh wall surrounding the perimeter of the trap, said mesh size selected to allow undersized crayfish to fall through said mesh when said trap is in its inclined and inverted position;
(c) a mesh bottom member having a baitholder mounted thereon for holding bait to attract said crayfish;
(d) a second mesh wall around the lower most portion of the trap defining gently sloping side walls, said second mess wall extending to a plurality of crayfish entrance slots arranged around the perimeter of the trap 3 to 6 inches above the mesh bottom;
(e) a third mesh wall defining a reverse sloping side wall, said third mesh wall extending from said crayfish entrance slots to said upper mesh wall,
whereby crayfish may walk up said gently sloping sidewalls to enter the crayfish entrance slots, said slots being arranged between said second and third mesh walls.

14. A one way trap means as claimed in claim 13 wherein said trap is cylindrical, and said second and third walls define truncated conical forms arranged with their truncated planes facing one another.

15. A one way trap means as claimed in claim 13 wherein said trap is rectangular, and said second and third walls define truncated pyramids with their truncated planes facing one another.

16. A method of harvesting edible decapod crustaceans from an aquatic bed, said method comprising:
(a) setting a plurality of one way traps in a predetermined pattern on the aquatic bed, the set period ranging from 5 to 120 minutes;
(b) raising said one way trap at the end of said 5 to 120 minutes set period to discharge collected crustacea into a plurality of collection bins, said discharge period ranging from 1 to 4 minutes;
(c) pumping water through a conduit arranged below said plurality of collection bins to convey the collected crustaceans discharge by said traps to a single storage means;
(d) moving said traps during said discharge period to a new position on the aquatic bed;
(e) lowering said one way traps to a new position on the aquatic bed at the end of said discharge period;
(f) repeating the above steps until the aquatic bed is traversed.

17. A method of harvesting edible decapod crustaceans as claimed in claim 16 which further comprises the step of aligning said traps in a linear array with each of said traps spaced 2 to 4 meters apart.

18. A method of harvesting edible decapod crustaceans as claimed in claim 16 which further comprises the step of repeating steps a, b, and c twice between each movement of the traps.

19. A method of harvesting edible decapod crustaceans as claimed in claim 16 which further comprises the steps of moving the harvester 3 to 12 meters between each set point for the traps.

20. A method of harvesting edible decapod crustacea as claimed in claim 17 which further comprises the steps of moving the harvester 3 to 12 meters between each set point of the traps.

21. A method of harvesting edible decapod crustaceans as claimed in claim 16 which further includes raising said traps vertically from the aquatic bed and then tipping them to an inclined and inverted position for discharging the collected crustaceans.

22. A method of harvesting edible decapod crustaceans as claimed in claim 16 which further includes the steps of:
(a) forming a plurality of rectangular ponds having a mean water level of 1 to 3 feet;
(b) alternating the harvesting of said edible decapod crustacean with planting and harvesting of a rice crop.

23. A method of harvesting edible decapod crustaceans as claimed in claim 16 which further includes the step of varying the trap set period as a function of water temperature.

* * * * *